Figure 1:
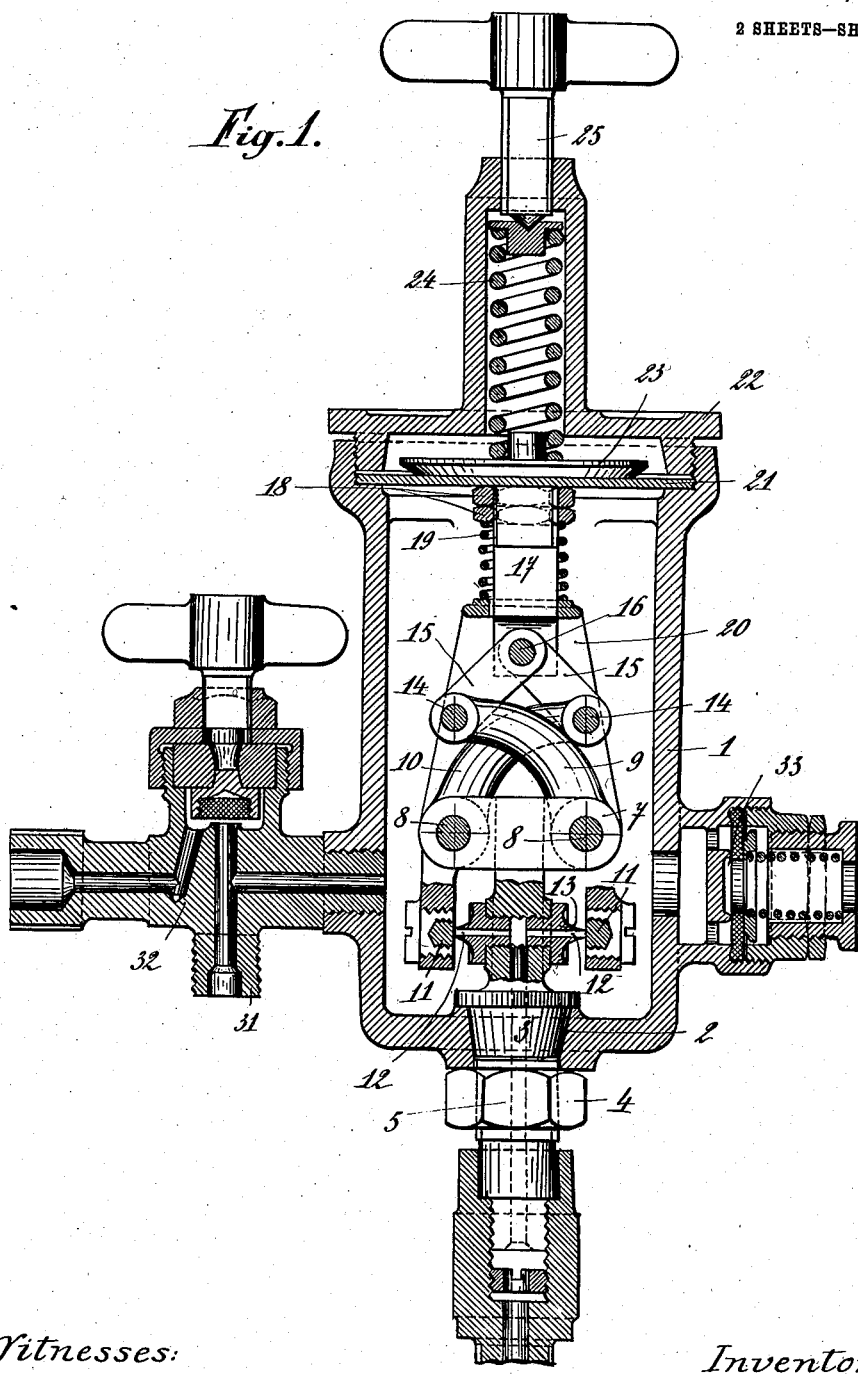

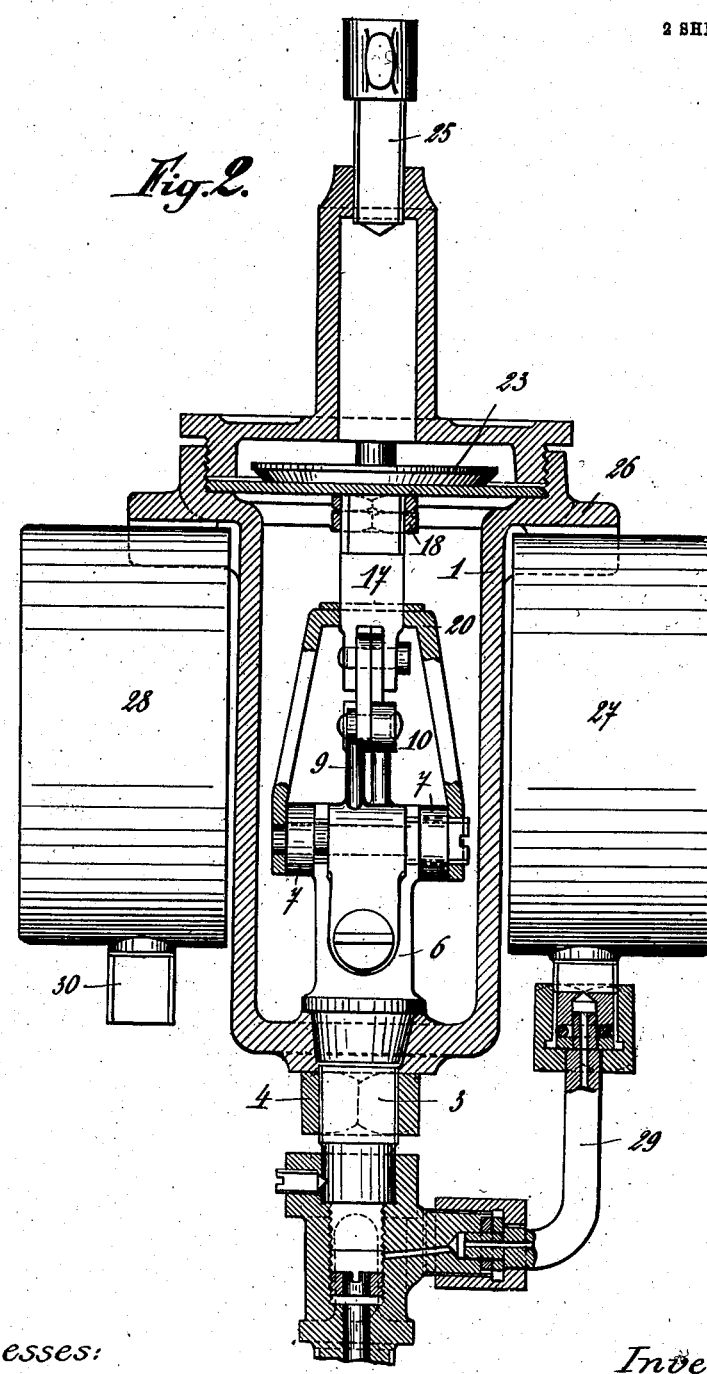

UNITED STATES PATENT OFFICE.

PRIMO LULLI, OF UCCLE, NEAR BRUSSELS, BELGIUM, ASSIGNOR TO SOCIÉTÉ ANONYME L'OXHYDRIQUE INTERNATIONALE, OF BRUSSELS, BELGIUM.

AUTOMATIC PRESSURE-REGULATOR.

No. 911,249.　　　　　Specification of Letters Patent.　　　Patented Feb. 2, 1909.

Application filed February 25, 1908. Serial No. 417,975.

*To all whom it may concern:*

Be it known that I, PRIMO LULLI, a subject of Italy, residing at Uccle, near Brussels, in the Kingdom of Belgium, have invented new and useful Improvements in Automatic Pressure-Regulators, of which the following is a specification.

This invention has for its object an automatic pressure regulator more particularly suitable for delivering, at a predetermined reduced pressure, a gas stored in a reservoir at very high pressure. This pressure regulator is differentiated from similar apparatus of known construction by a special arrangement and combinations of parts as will be hereafter described and pointed out in the appended claims.

The annexed drawing shows, by way of example, a pressure regulator embodying the invention.

Figure 1 is a vertical section of the apparatus. Fig. 2 is a section at right angles to the section shown in Fig. 1, certain parts of the mechanism being removed, and others shown in elevation.

As it will appear immediately from an inspection of the said figures, in an apparatus constructed according to the invention the admission of gas at high pressure is effected by means of two or more orifices of very small section, the opening of which is controlled by means of pivoted levers which reduce the force required to keep said orifices closed, the said levers being controlled by means of two springs separated by a diaphragm and acting in opposite directions, the difference of pressure or tension thereof determining the pressure of the expanded gas.

In the practical realization of the invention the regulator may be combined with two manometers fixed to the regulator casing and indicating respectively the gas-pressure in the reservoir and the delivery pressure. According to the particular purpose for which the regulator is used, the manometer indicating the delivery pressure may be calibrated in a special manner to directly indicate the nature of the work which can be performed by means of the pressure for which the apparatus is adjusted.

The apparatus comprises a casing 1 having at the bottom an opening 2 for the passage of a part 3, which is fixed by a nut 4 and traversed by a vertical conduit 5 for the entrance of gas under pressure. The apparatus is joined by means of the part 3 to the pipe supplying gas under pressure. Within the casing 1 the part 3 forms a support 6 having at its upper part two bosses or lugs 7 traversed by two pins 8, on which are fulcrumed curved levers 9 and 10 having at their lower ends plugs 11, for example of fiber or ebonite, abutting against nozzles 12 at the ends of horizontal ducts 13 which communicate with the conduit 5. The upper ends 14 of the levers 9 and 10 are pivoted to two small links 15 connected by a pin 16 to a rod 17. The latter has at its upper end two nuts 18, and a spring 19 coiled round the rod 17 abuts against the lower nut 18 and against a yoke 20 which is fixed to the lugs 7. The upper end of the rod 17 abuts against a diaphragm 21, for example of caoutchouc, fastened down at the edge by the cover 22 of the casing 1. On this diaphragm rests a disk 23, depressed by a spring 24, the pressure of which can be regulated by means of a screw 25.

The upper part of the casing 1 has two lateral projections 26, to which are fixed two manometers 27 and 28. The manometer 27 is connected by a tube 29 to the conduit supplying gas under pressure, as shown in Fig. 2, and the manometer 28 has joined to it at 30 a tube which is screwed at 31 to a valve or cock 32 for the delivery of the expanded gas. The apparatus may also comprise a safety-valve 33 of suitable construction.

From the description which has been given it is easy to understand the working of the apparatus. The spring 19 seated on the yoke 20 and acting on the rod 17 tends to hold the levers 9 and 10 against the nozzles 12, with a regulatable amount of force. If the force exerted by the spring 19 is properly adjusted the orifices for the inlet of gas at high pressure are closed until the said force is to a certain extent counteracted by the spring 24. The pressure exerted by the latter, suitably adjusted by means of the screw 25, acts through the disk 23 and diaphragm 21 on the rod 17 to reduce the force which tends to hold the levers 9 and 10 in the position in which they close the orifices of the nozzles 12. It is, therefore, possible to very exactly regulate the pressure at which the gas passes out of the apparatus, the regulation being effected by means of the screw 35, which acts on the spring 24. The expanded gas flows from the casing 1 through the valve or cock 32. The manometer 27 indicates the pressure at which gas is supplied to the regulator, and the manometer 28 indicates the pressure at which the gas is delivered. If, for example, the regulator is used in connection with cutting apparatus which works with the aid of a jet of oxygen under pressure, the manometer 28 may be calibrated to directly indicate the thickness of metal which can be cut with the aid of any given pressure within the limits of the scale, the scale-divisions being in that case according to thicknesses instead of according to atmospheres or kilograms.

The construction described not only has the advantage of allowing of very easy and exact regulation, but also the advantage that it allows of using a diaphragm absolutely independent of the closing devices, and that only a very small amount of force need be exerted for closing the gas-inlet orifices.

What I claim is:

1. In a pressure regulator, a casing, a central gas inlet in said casing, horizontal ducts communicating with said gas inlet, and opening in the casing, plugs adapted to close said ducts, a plurality of separate levers for moving said plugs into closing relation with said ducts, and a single spring equally impelling said levers in their closing movement.

2. In a pressure regulator, a casing, a central gas inlet in said casing, horizontal ducts communicating with said gas inlet and opening in the casing, plugs adapted to close said ducts, a plurality of independent levers adapted to move said plugs into closing relation on said ducts, a rod connected to each of said levers and adapted to move them equally into closing relation, and means for impelling said rod in such movement.

3. In a pressure regulator, a casing, a central gas inlet projecting from the bottom of said casing, horizontal ducts communicating with said gas inlet, nozzles at the end of said ducts, plugs adapted to rest against said nozzles, a single spring acting on the several plugs and means for regulating the action of said spring.

4. In a pressure regulator, a casing a central gas inlet projecting vertically from the bottom of said casing, horizontal ducts communicating with said gas inlet, nozzles at the end of said ducts, plugs adapted to rest against the said nozzles, pivoted levers carrying the said plugs, a spring actuated rod, links connecting the pivoted levers to said rod, and a spring loaded diaphragm acting on said rod.

5. In a pressure regulator, a casing, a central gas inlet, projecting from the bottom of said casing, horizontal ducts communicating with said gas inlet, nozzles at the end of the said ducts, plugs adapted to rest against the said nozzles, levers carrying the said plugs, a diaphragm two springs acting in opposite directions upon the said diaphragm and means whereby the difference of pressure of the two springs upon the diaphragm controls the pressure of the gas in the casing.

6. In a pressure regulator, a casing, a central gas inlet projecting from the bottom of said casing, horizontal ducts communicating with said gas inlet, nozzles at the end of said ducts, plugs adapted to rest against said nozzles, pivoted levers carrying the said plugs, a diaphragm, two springs acting in opposite directions upon the said diaphragm and means whereby the pressure on the diaphragm is transmitted to the pivoted levers.

7. In a pressure regulator, a casing, two lateral projections provided on said casing, a high pressure manometer fixed to one of the said lateral projections, a low pressure manometer fixed to the second lateral projection, a central gas inlet projecting from the bottom of the casing, horizontal ducts communicating with said gas inlet, nozzles at the end of said ducts, plugs adapted to rest against said nozzles, pivoted levers carrying the said plugs, a diaphragm, a spring actuated rod resting against the lower face of said diaphragm, links connecting the pivoted levers to said rod and a spring adapted to exert a variable pressure on the upper face of the diaphragm, substantially as described.

In testimony whereof I have signed my name to this specification in the presence of two subscribing witnesses.

PRIMO LULLI.

Witnesses:
  C. Z. CANCELIER,
  J. VAN BOECKEL.